(No Model.)

W. MIDDLEDITCH.
LATHE ATTACHMENT.

No. 335,609. Patented Feb. 9, 1886.

WITNESSES:
C. A. Preston
B. F. Wheeler

INVENTOR:
W. Middleditch
By
Roscoe B. Wheeler
att.

United States Patent Office.

WALTER MIDDLEDITCH, OF DETROIT, MICHIGAN.

LATHE ATTACHMENT.

SPECIFICATION forming part of Letters Patent No. 335,609, dated February 9, 1886.

Application filed October 12, 1885. Serial No. 179,717. (No model.)

*To all whom it may concern:*

Be it known that I, WALTER MIDDLEDITCH, a citizen of the United States, residing at Detroit, in the county of Wayne and State of Michigan, have invented certain new and useful Improvements in Lathe Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention is designed as a portable attachment to metal-working lathes for the purpose of enabling the operator to do the work of large lathes upon a small one, which without the attachment could not do the work. This attachment enables the operator to do the work upon a small lathe, requiring but a slight change, as will be hereinafter fully set forth.

My invention consists in the employment of a suitable support mounted upon the lathe, said support adapted to carry at an elevation to the spindle of the latter a shaft having on one end a face-plate and on the other end a pinion, said pinion working in connection with a train of gear-wheels mounted upon a wrist-pin and adapted to engage with a pinion on the free end of the lathe-spindle, as will be fully set forth, and pointed out in the claim.

Figure 1:
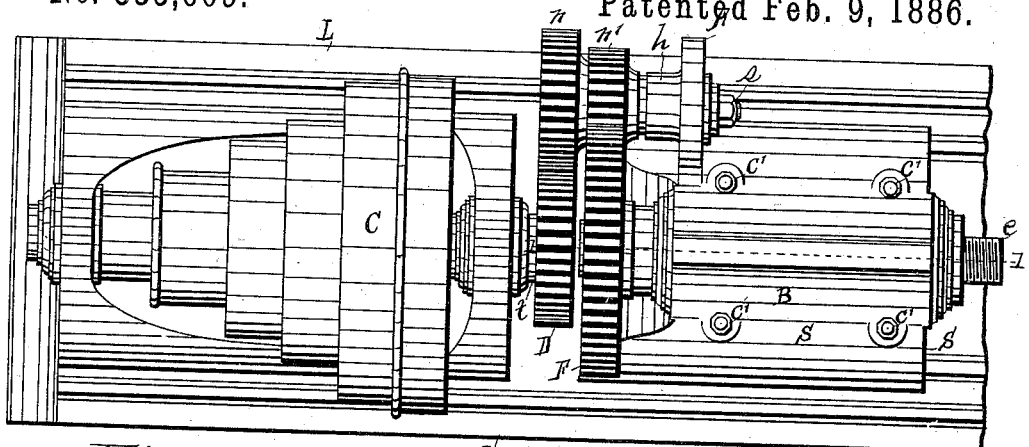
Figure 2:
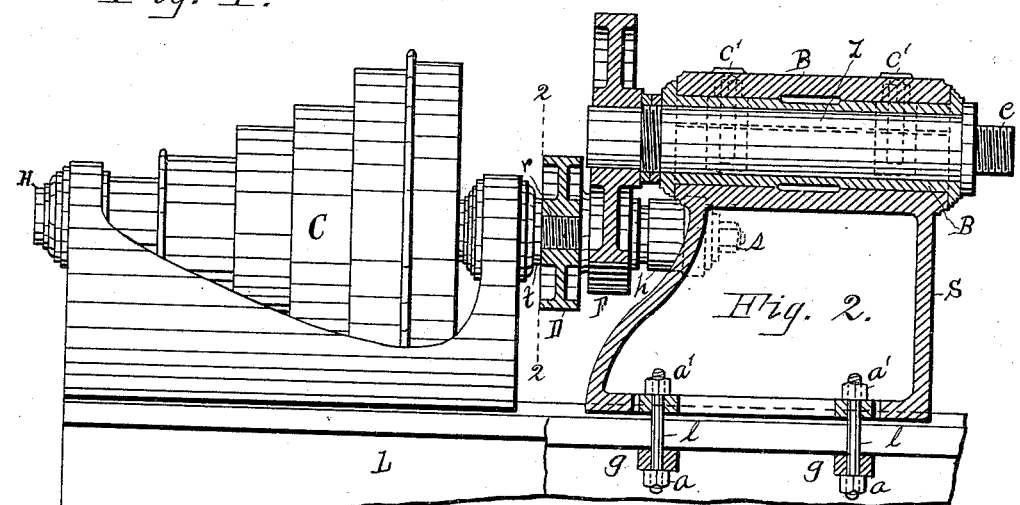
Figure 3:
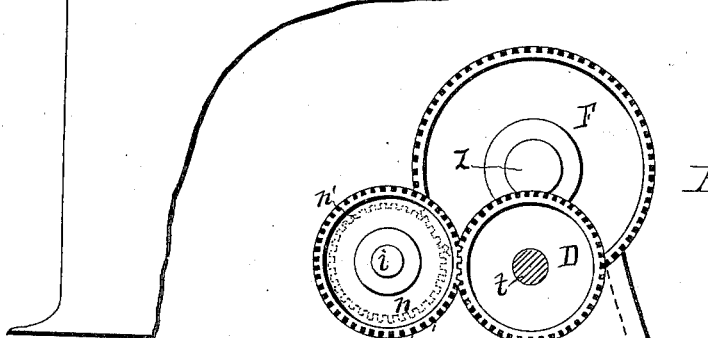

In the drawings forming a part of this specification, Figure 1 is a plan of my invention. Fig. 2 is a side elevation, with parts in section. Fig. 3 is an elevation on dotted line 2 2 of Fig. 2.

S is the rest or support, which I cast hollow, and is supported on the slides $v\,v$ of the lathe, being bolted firmly by two sets of bolts, $l\,l$, having nuts at each end, as $a\,a'$. (See Figs. 2 and 3.) The bolts pass through binding-bars $g\,g$.

B is a boxing mounted on said support, in which I journal at an elevation to the lathe-spindle $t$ the shaft $z$, its free end being screw-threaded at $e$ to receive a large face-plate or like tool. I attach firmly to the opposite end of said shaft the pinion F. I attach to or form integrally with the support an arm, A, having a hub or wrist support, $h$, on its vertical face. Passing through the hub of said arm is a wrist-pin, $i$, and by a nut, $s$, pin $i$ is secured to the arm. I mount upon said wrist-pin loosely a double gear-wheel, $n\,n'$, or two gear-wheels joined together so as to travel with each other.

In placing this attachment on the lathe I remove from the spindle $t$ of the lathe the ordinary face-plate, and screw thereon the gear-wheel D. The support S is then moved on the slides $v\,v$ toward the pinion D until the pinion $n$ engages with the pinion D, standing directly in line with each other, as clearly shown in Figs. 1 and 3, when the nuts $a\,a'$ are tightened, keeping the parts in position.

It will be observed from the foregoing description that by using the attachment having the shaft $z$ at an elevation to the spindle $t$ of the lathe, and removing from the lathe the ordinary face-plate and placing the pinion D in its place, and connecting the pinion F of said elevated shaft to the pinion D by a train of intermediate gear-wheels, and placing upon the free end of the shaft $z$ at $e$ a large face-plate, the operator is enabled to swing over the frame of the lathe, to bore out or otherwise finish a larger piece of machinery than he could possibly handle on the lathe as constructed for ordinary work.

This invention is designed to do the same work as a prior invention of mine for which a patent has been allowed to me. The prior device is designed more especially for lathes doing light work, and as a cheap attachment, while my present invention is designed for heavier work.

By using the intermediate gears, $n\,n'$, of various sizes, I am enabled to regulate the speed of the shaft $z$ to a very fine degree in connection with the cone C of pulleys upon the lathe.

Having thus fully set forth my present invention, what I claim as new, and desire to secure by Letters Patent, is—

A lathe attachment comprising a support removably mounted upon a lathe-bed, a rotatable shaft in said support, carrying a gear-wheel at one end and threaded at the other to receive face-plates of different sizes, a gear-wheel mounted on the spindle of the lathe in the position of the ordinary face-plate, and gears intermediate the last-mentioned gear-wheel and that on the shaft of the removable support, all combined and arranged substantially as set forth.

In testimony whereof I affix my signature in presence of two witnesses.

WALTER MIDDLEDITCH.

Witnesses:
R. B. WHEELER,
B. F. WHEELER.